(12) United States Patent
Naito

(10) Patent No.: US 12,456,897 B2
(45) Date of Patent: Oct. 28, 2025

(54) POWER TOOL

(71) Applicant: MAKITA CORPORATION, Anjo (JP)

(72) Inventor: Akira Naito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 557 days.

(21) Appl. No.: 17/949,687

(22) Filed: Sep. 21, 2022

(65) Prior Publication Data
US 2023/0150104 A1 May 18, 2023

(30) Foreign Application Priority Data
Nov. 17, 2021 (JP) .................................. 2021-187288

(51) Int. Cl.
*H02K 5/14* (2006.01)
*B25D 17/04* (2006.01)
(Continued)

(52) U.S. Cl.
CPC ............. *H02K 5/143* (2013.01); *B25D 17/04* (2013.01); *H02K 5/148* (2013.01); *H02K 5/207* (2021.01);
(Continued)

(58) Field of Classification Search
CPC .......... H02K 5/143; H02K 5/14; H02K 5/148; H02K 5/207; H02K 9/06; H02K 13/04; H02K 13/06; H02K 13/10; B25D 17/04; B25D 17/11; B25D 2250/121; B25D 11/00; B25D 2250/095; B25D 16/00; B25F 5/008; B25F 5/02
See application file for complete search history.

(56) References Cited

U.S. PATENT DOCUMENTS

| | | |
|---|---|---|
| 5,138,243 A | 8/1992 | Kress et al. |
| 5,196,747 A | 3/1993 | Kress et al. |
| (Continued) | | |

FOREIGN PATENT DOCUMENTS

| | | | |
|---|---|---|---|
| GB | 2182501 A * | 5/1987 | .......... H02K 11/026 |
| JP | H03139152 A | 6/1991 | |
| (Continued) | | | |

OTHER PUBLICATIONS

English translation of WO-2016013178-A1 (Year: 2016).*
Jul. 1, 2025 Office Action issued in Japanese Patent Application No. 2021-187288.

*Primary Examiner* — Tulsidas C Patel
*Assistant Examiner* — Joshua Kiel M Rodriguez
(74) *Attorney, Agent, or Firm* — Oliff PLC

(57) ABSTRACT

A power tool is less likely to generate noise. A power tool includes a housing, a field fixed to the housing and including a field coil, an armature rotatable relative to the field and including a commutator, two brushes that come in contact with the commutator, and a brush holder unit holding the two brushes. The brush holder unit includes two contact rails electrically connectable to the field coil, two first terminals that each come in contact with either of the two contact rails, two second terminals each electrically connectable to a corresponding brush of the two brushes, and a choke coil located between at least one of the two first terminals and at least one of the two second terminals.

17 Claims, 13 Drawing Sheets

(51) Int. Cl.

| | | |
|---|---|---|
| *B25D 17/11* | (2006.01) | |
| *H02K 5/20* | (2006.01) | |
| *H02K 9/06* | (2006.01) | |
| *H02K 13/04* | (2006.01) | |
| *H02K 13/06* | (2006.01) | |
| *H02K 13/10* | (2006.01) | |

(52) U.S. Cl.
CPC ............... *H02K 9/06* (2013.01); *H02K 13/04* (2013.01); *H02K 13/06* (2013.01); *H02K 13/10* (2013.01); *B25D 17/11* (2013.01); *B25D 2250/121* (2013.01)

(56) References Cited

U.S. PATENT DOCUMENTS

| | | |
|---|---|---|
| 5,772,498 A | 6/1998 | Neubert et al. |
| 2009/0057123 A1 | 3/2009 | Yoshikawa |
| 2015/0144368 A1 | 5/2015 | Machida |
| 2016/0136801 A1 | 5/2016 | Furusawa et al. |
| 2017/0104395 A1* | 4/2017 | Tamura .................. H02K 5/145 |
| 2017/0179793 A1* | 6/2017 | Servin .................. H02K 13/006 |

FOREIGN PATENT DOCUMENTS

| | | | |
|---|---|---|---|
| JP | H03150057 A | 6/1991 | |
| JP | H06-233499 A | 8/1994 | |
| JP | 2009050957 A | 3/2009 | |
| JP | 2015-100899 A | 6/2015 | |
| JP | 6309881 B2 | 4/2018 | |
| WO | WO-2016013178 A1 * | 1/2016 | ............. H02K 13/06 |

* cited by examiner

POWER TOOL

CROSS-REFERENCE TO RELATED APPLICATIONS

This application claims the benefit of priority to Japanese Patent Application No. 2021-187288, filed on Nov. 17, 2021, the entire contents of which are hereby incorporated by reference.

BACKGROUND

1. Technical Field

The present disclosure relates to a power tool including a hammer drill.

2. Description of the Background

A known hammer drill includes an electric motor as described in Japanese Patent No. 6309881.

BRIEF SUMMARY

Known hammer drills may generate noise from electromagnetic interference (EMI) caused by, for example, commutation in electric motors.

Thus, techniques for reducing noise generation in a power tool are awaited.

A first aspect of the present disclosure provides a power tool, including:
a housing;
a field fixed to the housing, the field including a field coil;
an armature rotatable relative to the field, the armature including a commutator;
a brush configured to come in contact with the commutator; and
a choke coil configured to electrically connect the field coil and the brush, A second aspect of the present disclosure provides a power tool, including:
a housing;
a field fixed to the housing, the field including a field coil;
an armature rotatable relative to the field, the armature including a commutator;
two brushes configured to come in contact with the commutator; and
a brush holder unit holding the two brushes, the brush holder unit including
  a stationary housing,
  two contact rails held by the stationary housing and electrically connectable to the field coil,
  a movable housing holding the two brushes and movable relative to the stationary housing,
  two first terminals held by the movable housing, each of the two first terminals being configured to come in contact with either of the two contact rails in response to movement of the movable housing,
  two second terminals held by the movable housing, each of the two second terminals being electrically connectable to a corresponding brush of the two brushes, and
  a choke coil located between at least one of the two first terminals and at least one of the two second terminals.

The power tool according to the above aspects of the present disclosure is less likely to generate noise.

DETAILED DESCRIPTION

Embodiments and modifications of the present disclosure will now be described with reference to the drawings as appropriate.

The directional terms such as front, rear, up, down, right, and left in the embodiments and the modifications are defined for ease of explanation, and may be changed depending on, for example, the operating situations or the status of a movable member.

Figure 1:
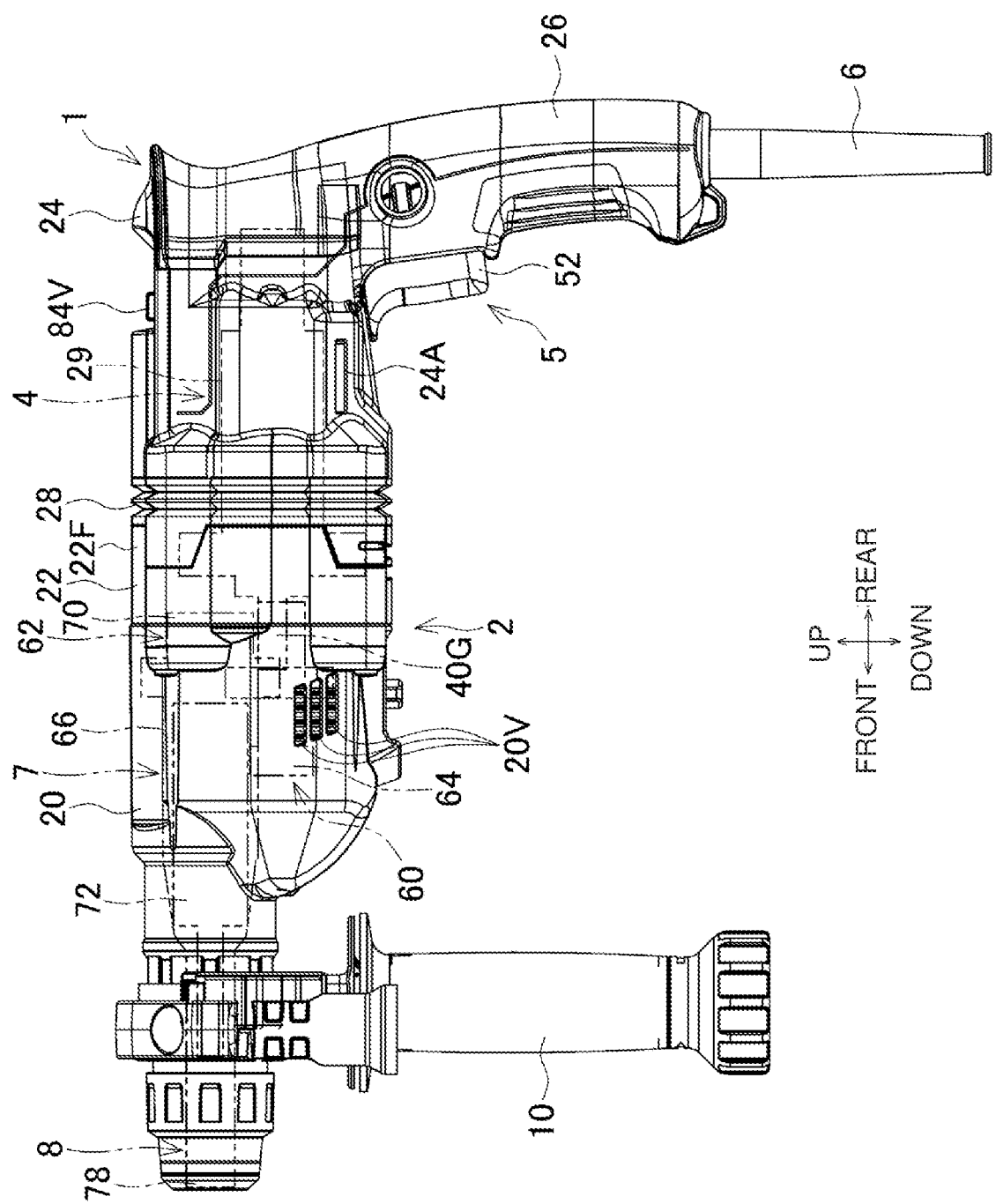
FIG. 1 is a left side view of a hammer drill according to one or more embodiments of the present disclosure.
Figure 2:
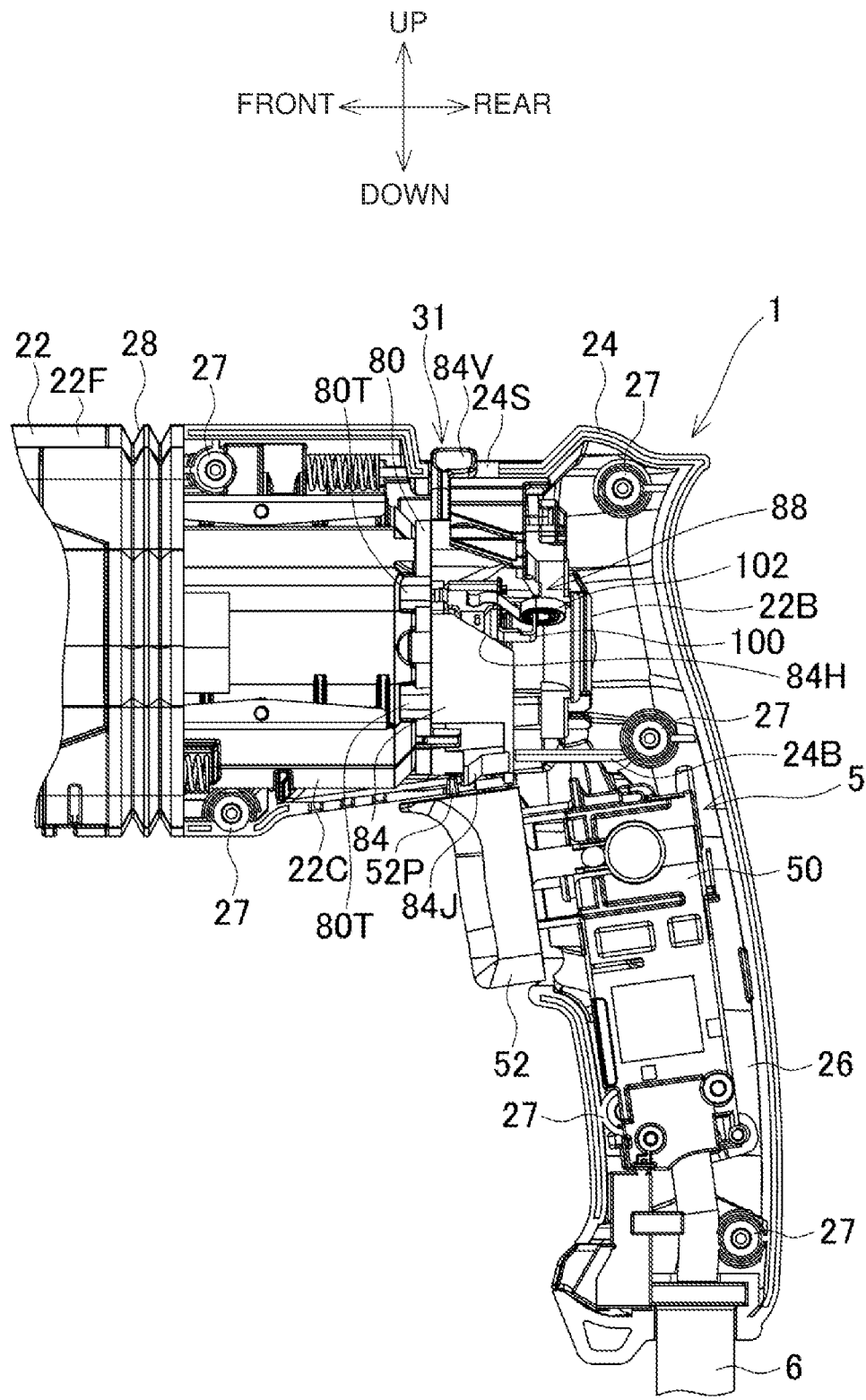
FIG. 2 is a view of a rear part of FIG. 1 without a cover.
Figure 3:
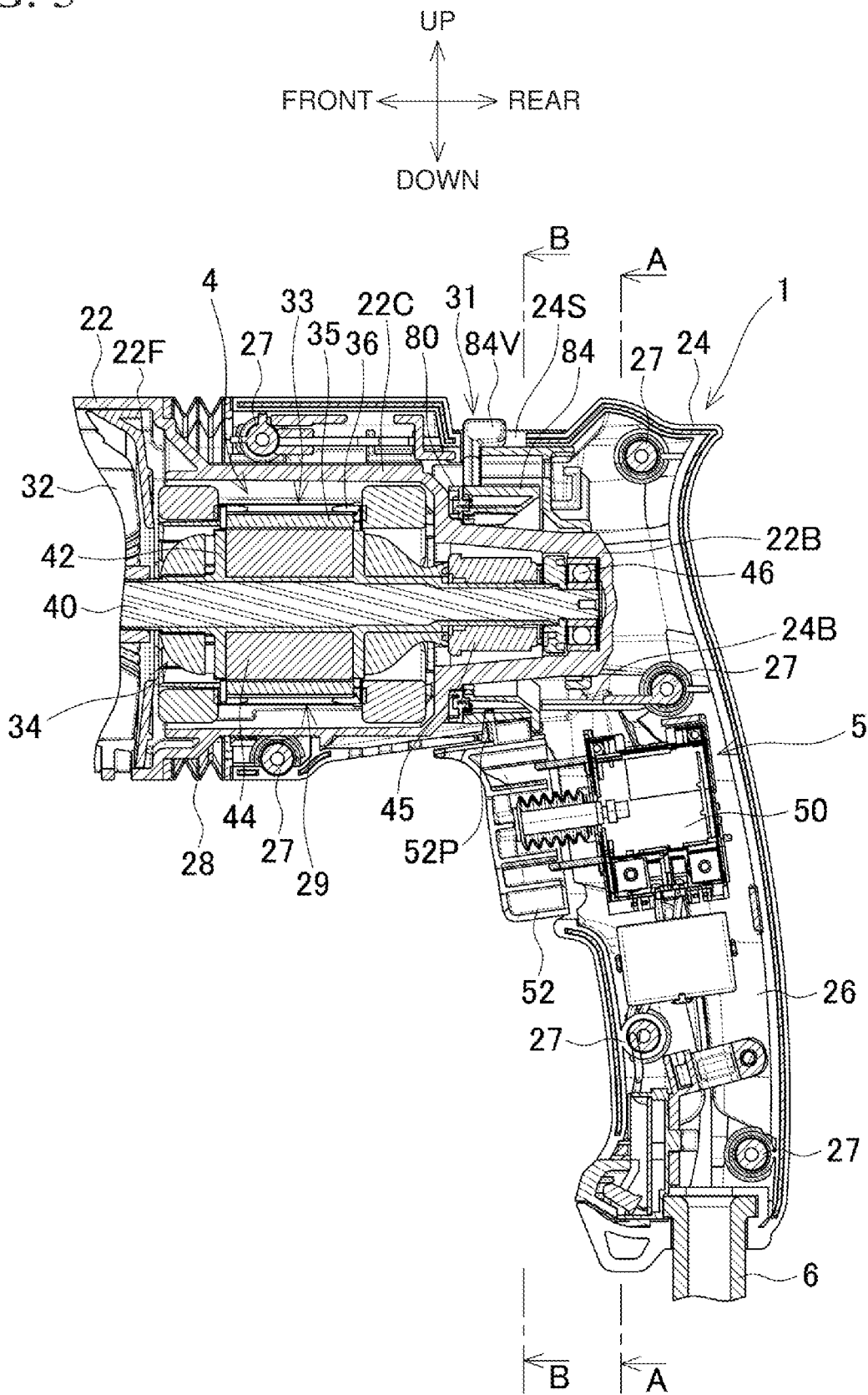
FIG. 3 is a longitudinal central sectional view of FIG. 2.
Figure 4:
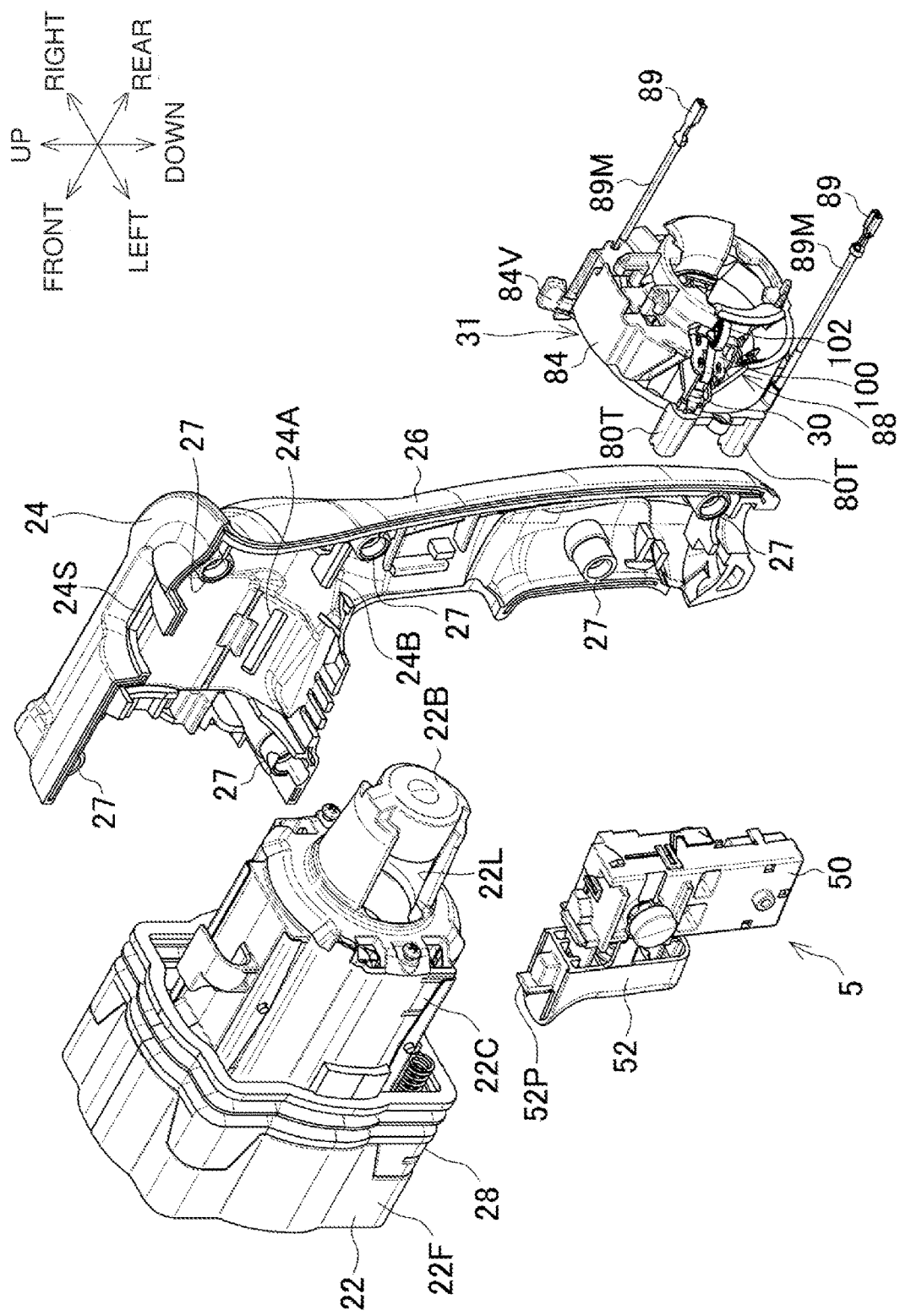
FIG. 4 is a partially exploded perspective view of FIG. 2.
Figure 5:
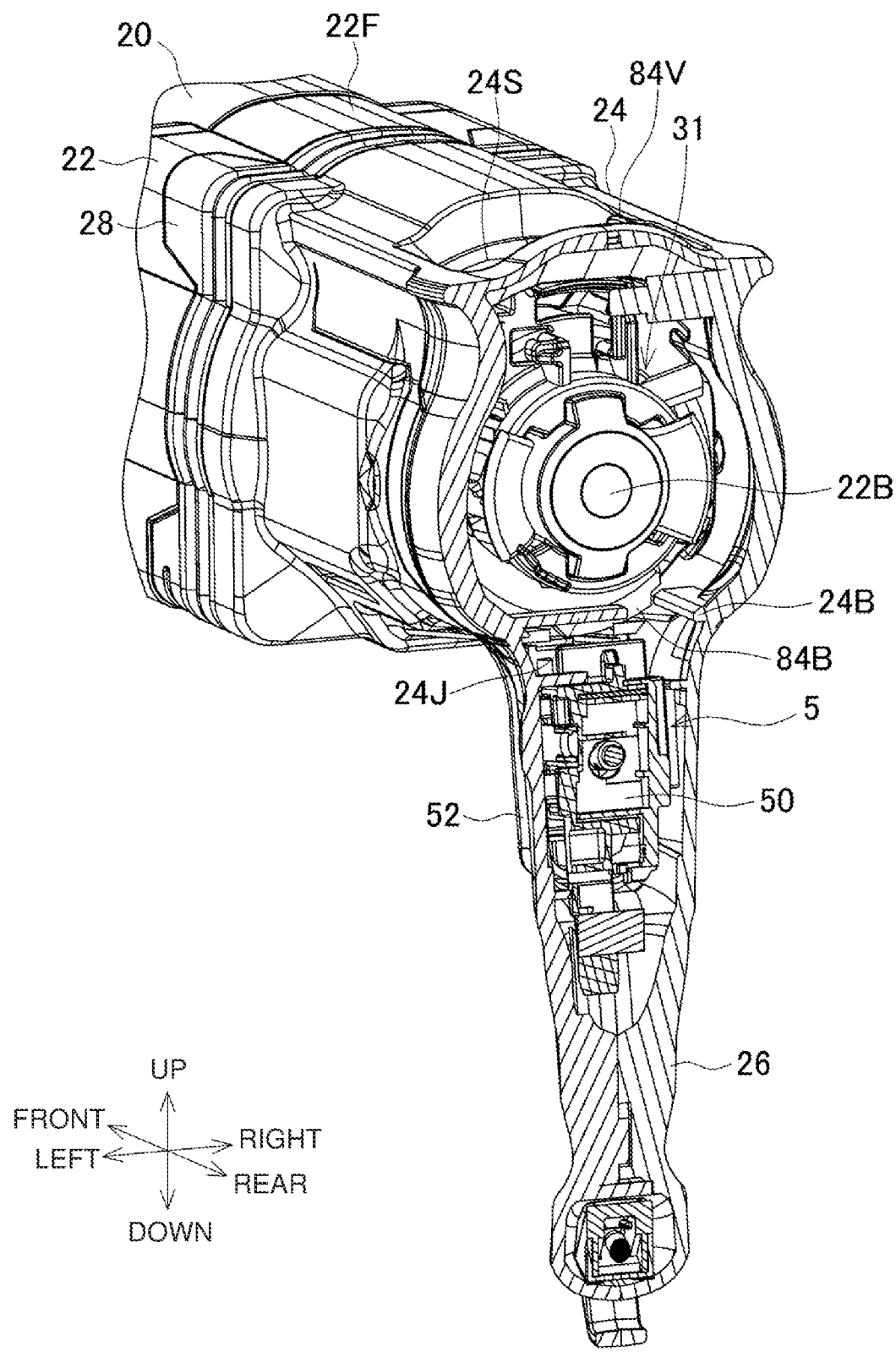
FIG. 5 is a perspective view including a cross section taken along line A-A in FIG. 3.
Figure 6:
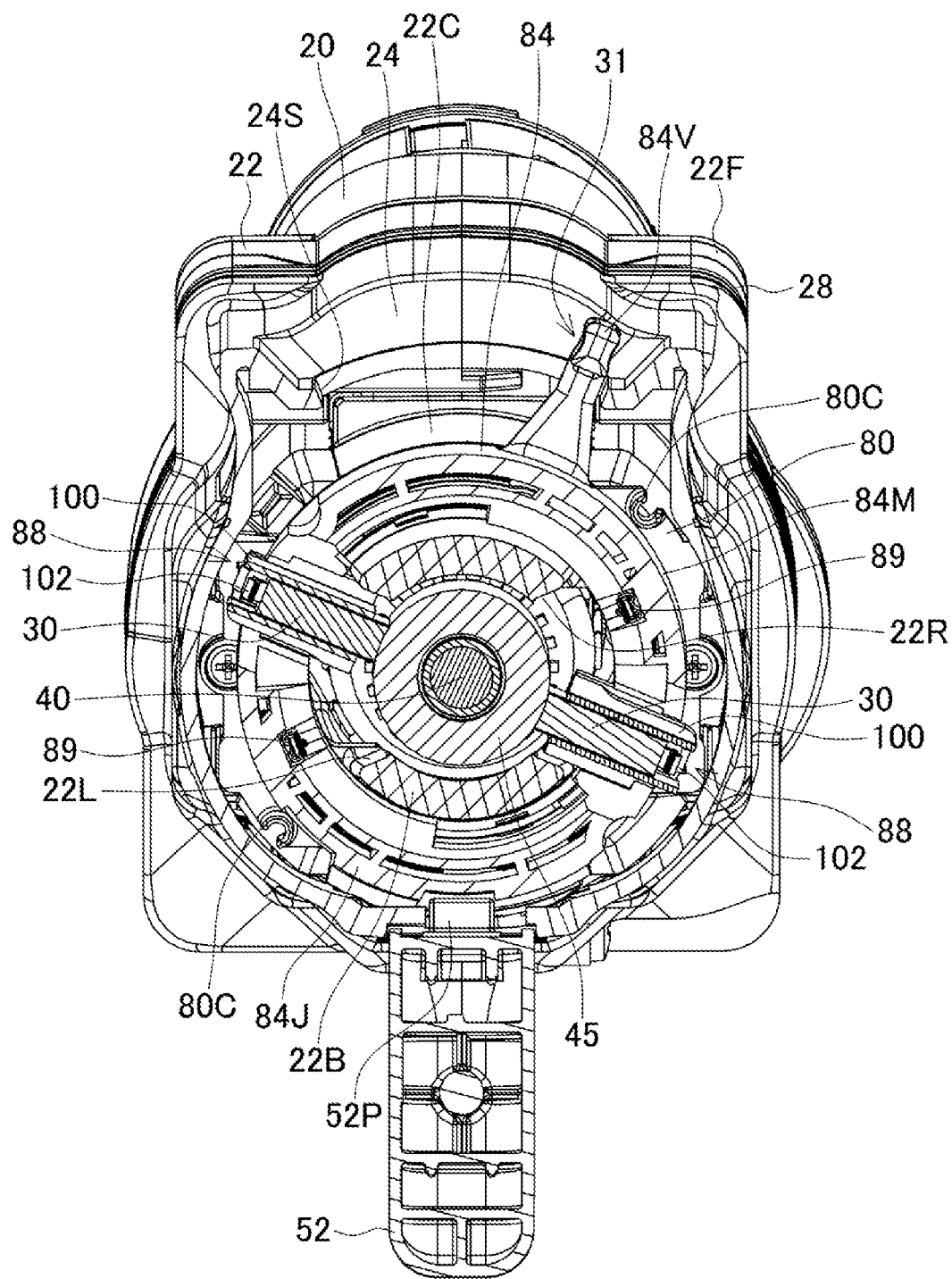
FIG. 6 is a perspective view including a cross section taken along line B-B in FIG. 3.

The present disclosure is not limited to the embodiments and the modifications described below FIG. 1 is a left side view of a hammer drill 1 as an example of a power tool (striking tool) according to one or more embodiments of the present disclosure. FIG. 2 is a view of a rear part of FIG. 1 without a cover. FIG. 3 is a longitudinal central sectional view of FIG. 2. FIG. 4 is a partially exploded perspective view of FIG. 2. FIG. 5 is a perspective view including a cross section taken along line A-A in FIG. 3. FIG. 6 is a perspective view including a cross section taken along line B-B in FIG. 3.

The hammer drill 1 includes a housing 2, a power unit 4, a trigger unit 5, a power cable 6, an intermediate portion 7, an output unit 8, and an auxiliary handle 10.

The power unit 4 has its axis in the front-rear direction. The output unit 8 has its axis in the front-rear direction.

The housing 2 holds the components directly or indirectly.

The housing 2 includes a gear housing 20, a motor housing 22, and an outer housing 24.

The gear housing 20 is cylindrical. The gear housing 20 extends in the front-rear direction.

The gear housing 20 holds the intermediate portion 7.

The gear housing 20 includes multiple outlets 20V. The outlets 20V are located in a lower left portion and a lower right portion of the gear housing 20.

The motor housing 22 is cylindrical. The motor housing 22 extends in the front-rear direction. The motor housing 22 includes a middle motor housing 22C as its middle portion. The motor housing 22 includes a front motor housing 22F as its front portion. The motor housing 22 includes a rear motor housing 22B as its rear portion.

The outer housing 24 includes a rear portion being an outer wall of a handle 26. The handle 26 extends vertically.

A lateral direction is substantially orthogonal to the front-rear direction and the vertical direction.

The outer housing 24 includes left and right halves. The left half of the outer housing 24 includes multiple screw bosses 27. The screw bosses 27 receive screws that join the left and right halves of the outer housing 24 together.

The outer housing 24 includes multiple inlets 24A. The inlets 24A are located in the lower left and the lower right of a middle portion of the outer housing 24 in the front-rear direction.

The middle motor housing 22C is vertically and laterally smaller than the front motor housing 22F.

The rear motor housing 22B is vertically and laterally smaller than the middle motor housing 22C.

The middle motor housing 22C and the rear motor housing 22B hold the power unit 4.

An upper portion of the outer housing 24 is located outside the middle motor housing 22C and the rear motor housing 22B.

A flexible member 28 is located between the front end of the outer housing 24 and the rear end of the front motor housing 22F. The flexible member 28 is elastic. The flexible member 28 is a bellows.

The outer housing 24 is movable in the front-rear direction relative to the motor housing 22. As the outer housing 24 moves, the flexible member 28 expands or contracts.

The outer housing 24 is located behind the motor housing 22 with the flexible member 28 being in an equilibrium length or a length close to an equilibrium length (normal state). The outer housing 24 moves forward relative to the motor housing 22 (forward state) from the normal state.

The flexible member 28 located between the motor housing 22 and the outer housing 24 reduces vibration generated in the power unit 4, the intermediate portion 7, the output unit 8, and another portion.

The outer housing 24 has a slot 24S in its upper surface. The slot 24S extends laterally.

The outer housing 24 includes an outer rib 24B on its inner surface. The outer rib 24B protrudes inward from the surrounding portion. The outer rib 24B is located in the right half of the outer housing 24 and above the handle 26. The outer rib 24B extends in the front-rear and lateral directions. The outer rib 24B may be located in another portion, for example, at the upper end of the handle 26 or in the left half of the outer housing 24.

The outer housing 24 includes a center rib 24J on its inner surface (FIG. 5). The center rib 24J protrudes inward from the surrounding portion. The center rib 24J is located in the left half of the outer housing 24 and above the handle 26. The center rib 24J extends in the front-rear and lateral directions. The center rib 24J is located on the left of the outer rib 24B. The center rib 24J and the outer rib 24B face each other. The center rib 24J may be located in another portion, for example, at the upper end of the handle 26, in a portion that does not face the outer rib 24B, or in the right half of the outer housing 24.

The power unit 4 includes a motor 29, multiple (two) brushes 30, a brush holder unit (BHU) 31, and a fan 32.

The motor 29 is an electric motor.

The motor 29 includes a field 33 (stator) and an armature 34 (rotor).

The field 33 includes a field core 35 and multiple field coils 36. The field core 35 is cylindrical. The field core 35 is fixed to the housing 2. The field core 35 includes, on its inner surface, multiple projections around which the field coils 36 are wound.

The armature 34 includes a motor shaft 40, an armature core 42, multiple armature coils 44, and a commutator 45. The motor shaft 40 extends in the front-rear direction. The motor shaft 40 includes a pinion gear 40G at its front end (FIG. 1). The armature core 42 is fixed to a middle portion of the motor shaft 40 in the front-rear direction. The armature core 42 has multiple slots. The armature coils 44 are wound through the corresponding slots in the armature core 42. The commutator 45 is cylindrical. The commutator 45 includes multiple conductive portions. The conductive portions are aligned in the circumferential direction of the motor shaft 40. The armature coils 44 are electrically connected to the conductive portions in a predetermined manner.

The motor shaft 40 has its rear end rotatably supported in a rear bearing 46. The rear bearing 46 is held in the rear end of the rear motor housing 22B. The commutator 45 is located between the rear bearing 46 and the armature core 42. The rear motor housing 22B has a left opening 22L in a portion on the left of the commutator 45. The rear motor housing 22B has a right opening 22R in a portion on the right of the commutator 45.

The motor shaft 40 has its front end rotatably supported in a front bearing (not shown). The front bearing is held in the rear end of the gear housing 20.

The motor shaft 40 is rotatable on its central axis.

The brushes 30 are formed from carbon.

The BHU 31 is located radially outward from the rear motor housing 22B. The BHU 31 is annular or cylindrical. The BHU 31 holds the brushes 30. This structure allows the BHU 31 to be positioned more efficiently relative to the motor 29.

The fan 32 is integrally attached to the outer circumference of the motor shaft 40.

The fan 32 is a centrifugal fan.

The fan 32 is located between the pinion gear 40G and the armature 34. The fan 32 is located in the front motor housing 22F.

The trigger unit 5 includes a trigger switch 50 and a trigger 52.

The trigger 52 is attached to a plunger for switching the trigger switch 50.

The trigger switch 50 is located in the handle 26.

The trigger 52 has a front portion exposed from a front middle portion of the outer housing 24 in the vertical direction. When a user operates the trigger 52 backward, the trigger switch 50 switches its state.

The trigger 52 includes an upper-trigger projection 52P at its top. The upper-trigger projection 52P protrudes upward from the surrounding portion.

The power cable 6 is electrically connected to the trigger switch 50 and the motor 29.

The intermediate portion 7 includes a power transmission 60 and a striking assembly 62 (FIG. 1).

The power transmission 60 includes a countershaft 64 and a cylinder 66. The countershaft 64 extends in the front-rear direction. The countershaft 64 has its rear end meshing with the pinion gear 40G on the motor shaft 40. The countershaft 64 is rotatable on its central axis. The cylinder 66 is cylindrical. The cylinder 66 has, at its rear end, an outer surface meshing with the front end of the countershaft 64. The cylinder 66 is rotatable on its central axis.

The striking assembly 62 includes a swing shaft 70 and a striking unit 72. The swing shaft 70 is connected to the countershaft 64. The swing shaft 70 is located radially outward from the countershaft 64. The swing shaft 70 extends upward from the countershaft 64. When the countershaft 64 rotates, the swing shaft 70 swings with its upper end moving back and forth. The striking unit 72 includes a piston, a striker, and an air chamber between the piston and the striker. The striking unit 72 extends in the front-rear direction. The striking unit 72 includes a rear portion located in the cylinder 66. The striking unit 72 is connected to the distal end of the swing shaft 70. The striking unit 72 is movable in the front-rear direction when the swing shaft 70 swings.

The output unit 8 includes a tip tool holder 78 (FIG. 1). The tip tool holder 78 is cylindrical. The tip tool holder 78 can hold a tip tool such as a drill bit. The tip tool holder 78 is located in front of the cylinder 66 and is connected to the cylinder 66. The central axis of the tip tool holder 78 is aligned with the central axis of the cylinder 66. The tip tool holder 78 is integral with the cylinder 66 and is rotatable on its central axis.

The striking unit 72 has its front end adjacent to or received in the rear end of the tip tool holder 78, and can strike the tip tool in the tip tool holder 78.

The power transmission 60 rotates the cylinder 66. The rotation is transmitted to the tip tool through the tip tool holder 78.

The auxiliary handle 10 is attached to the outer surface of the gear housing 20. The auxiliary handle 10 is detachable.

Figure 7:
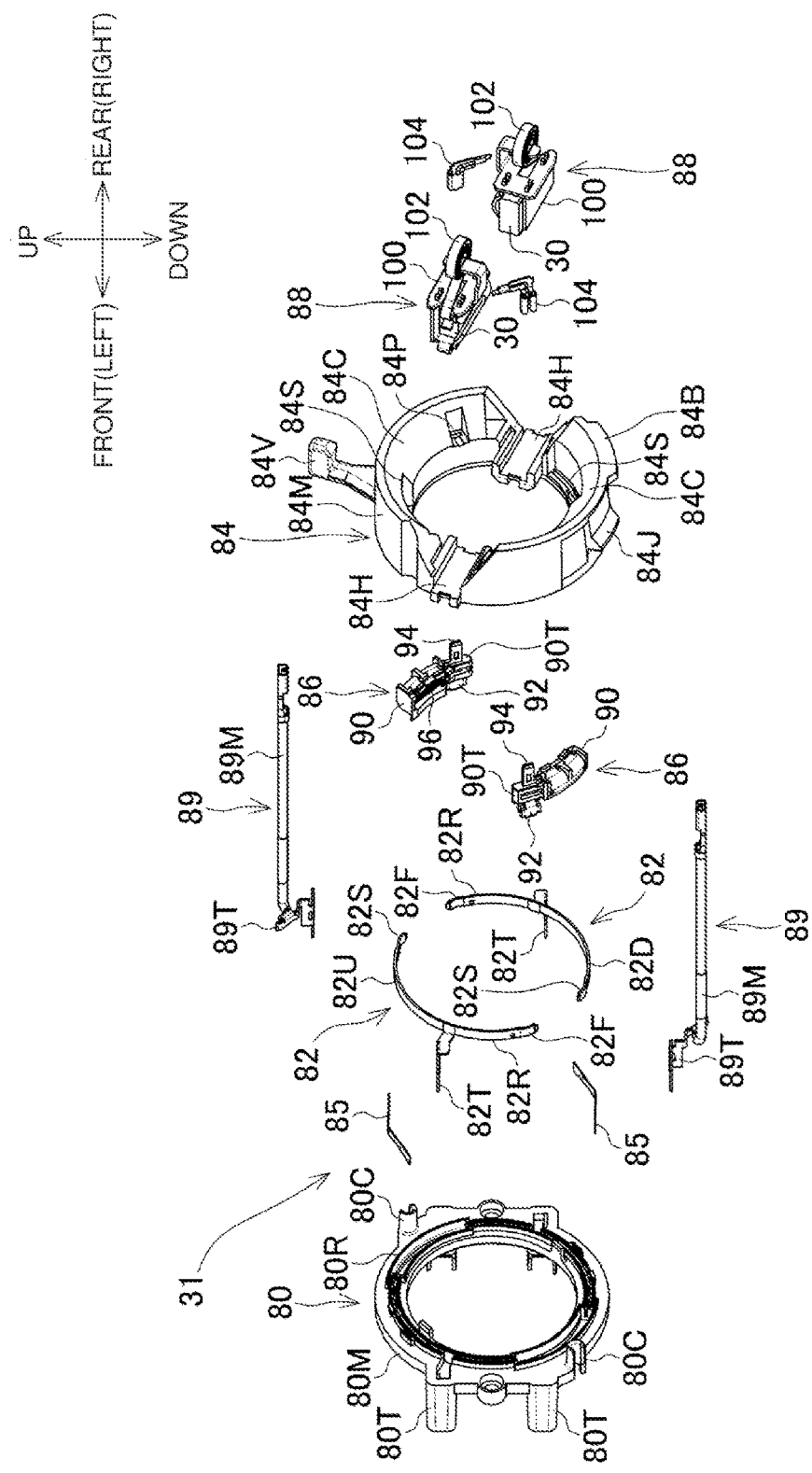
FIG. 7 is an exploded perspective view of a brush holder unit (BHU) in FIG. 2 as viewed from the rear.
Figure 8:
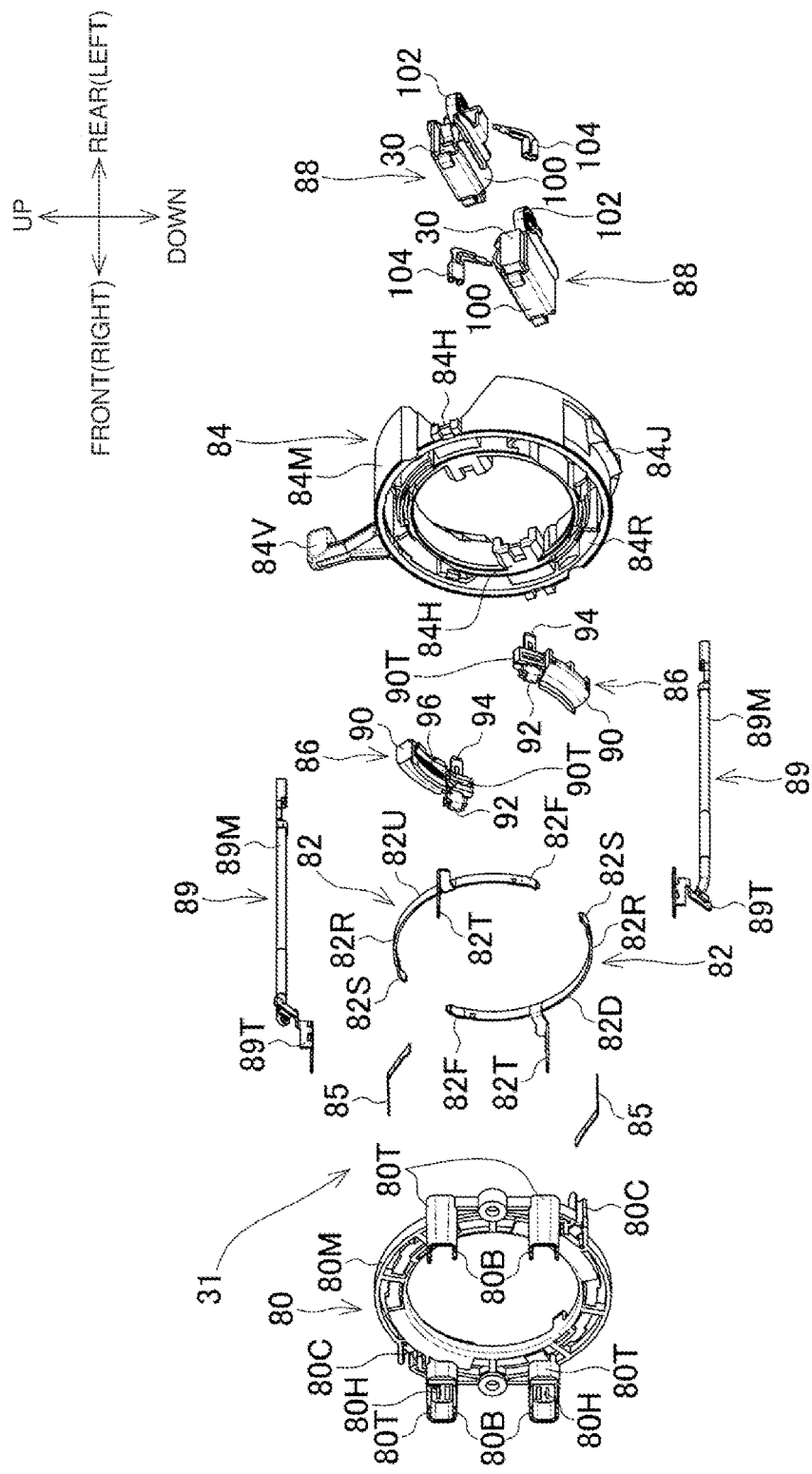
FIG. 8 is an exploded perspective view of the BHU in FIG. 2 as viewed from the front.

FIGS. 7 and 8 are exploded perspective views of the BHU 31.

The BHU 31 includes a stationary housing 80, multiple (two) contact rails 82, a movable housing 84, multiple (two) leaf springs 85 being elastic members, multiple (two) brush connection terminal units 86, multiple (two) brush holders 88, and multiple (two) lead wires 89.

The stationary housing 80 includes a stationary housing body 80M, a rail retainer 80R, multiple (two) protrusions 80C, and multiple (four) terminal retainers 80T.

The stationary housing body 80M is annular.

The rail retainer 80R is at the rear of the stationary housing body 80M and is recessed frontward. The rail retainer 80R is annular.

The protrusions 80C protrude rearward from the rear end face of the stationary housing body 80M.

The terminal retainers 80T protrude frontward from the front of the stationary housing body 80M. Each terminal retainer 80T includes a hole 80H and a rectangular portion 80B. The hole 80H extends in the front-rear direction. The rectangular portion 80B is located at the front end of the terminal retainer 80T. The rectangular portion 80B is open at its front and radially inward portion. The rectangular portion 80B has four surfaces, or a rear surface, an upper surface, a lower surface, and a radially outward surface. The rectangular portion SOB communicates with the hole 80H on its rear surface. One or more surfaces of the rectangular portion 80B may be eliminated.

The stationary housing 80 is attached to the outer surface of the rear end of the middle motor housing 22C. The stationary housing body 80M is located behind the rear end face of the middle motor housing 22C. The terminal retainers 80T are each located outward from the upper right, the lower right, the upper left, and the lower left of the rear of the middle motor housing 22C.

The contact rails 82 are formed from metal (brass). The contact rails 82 are thus resistant to at least one of friction or heat. Each contact rail 82 includes a rail portion 82R and a terminal portion 82T. Hereafter, the contact rail 82 located above may he referred to as an upper contact rail 82U, and the contact rail 82 located below may be referred to as a lower contact rail 82D.

The rail portions 82R are arc-shaped and semicircular. The rail portions 82R are plates. The rail portions 82R extend in the circumferential and front-rear directions. Each rail portion 82R includes a first arch 82F at its first end. Each rail portion 82R includes a second arch 82S at its second end. The first arch 82F has a smaller radius of curvature than the other portion of the rail portion 82R. The first arch 82F extends radially more outward than the other portion of the rail portion 82R. The second arch 82S has the same structure as the first arch 82F.

The upper contact rail 82U includes the first arch 82F on its left end and the second arch 82S on its right end. The lower contact rail 82D includes the first arch 82F on its right end and the second arch 82S on its left end. The second arch 82S may be different from the first arch 82F. At least one of the first arch 82F or the second arch 82S may be eliminated.

The terminal portion 82T is a folded plate. The terminal portion 82T is continuous with an intermediate portion of the rail portion 82R. The terminal portion 82T intersects with the rail portion 82R.

Figure 9:
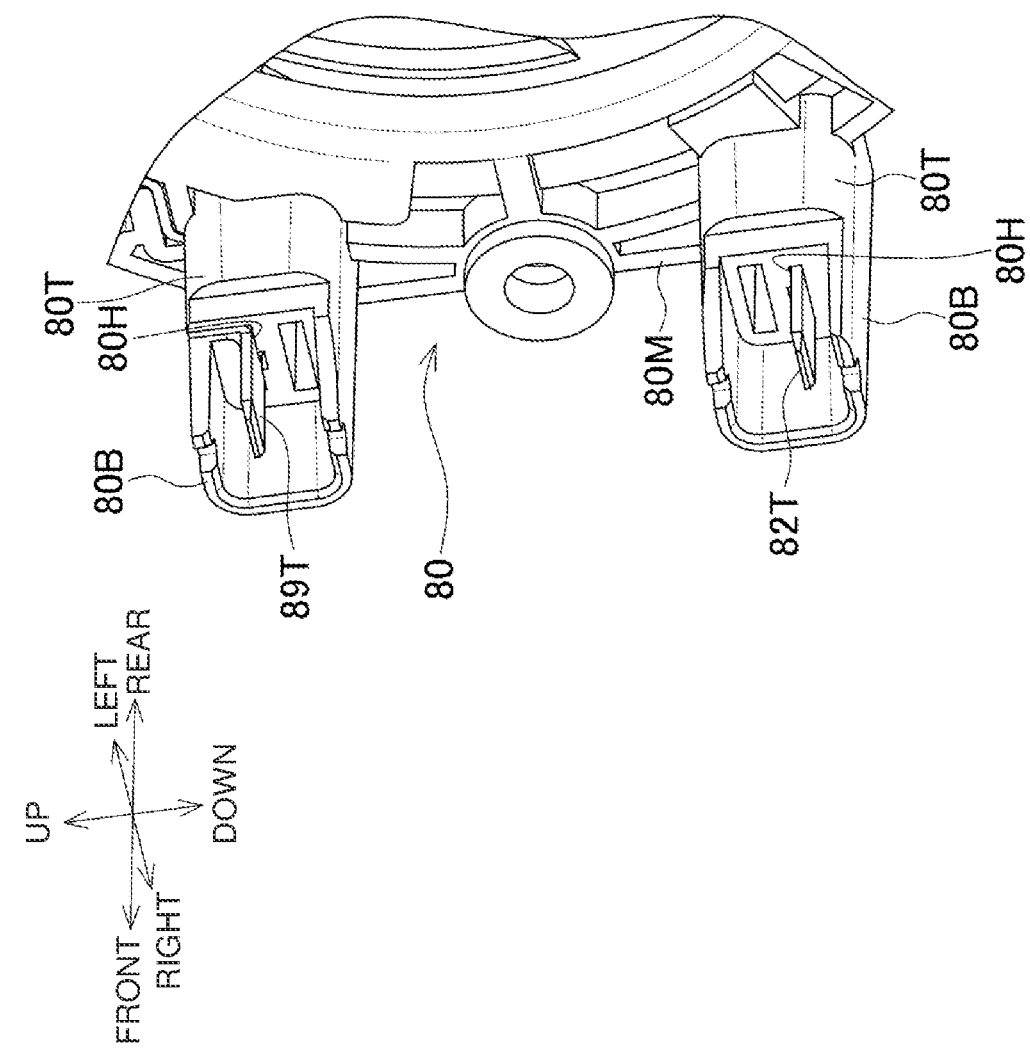
FIG. 9 is a partially enlarged perspective view of a stationary housing in the BHU in FIG. 7, the front end of a terminal portion of a contact rail, and the front end of a lead wire terminal.

As shown in FIG. 9, with the terminal portion 82T placed in the hole 80H in the corresponding terminal retainer 80T, each contact rail 82 is held by the stationary housing 80. Each terminal portion 82T has its front end reaching the corresponding rectangular portion 80B. The front edge of the terminal portion 82T is located rearward from the front edge of the rectangular portion 80B. In other words, the front end of each terminal portion 82T does not protrude from the corresponding rectangular portion 80B, and is located rearward from the front edge of the corresponding rectangular portion 80B. The rail portions 82R are located in the rail retainer 80R.

The front end of each terminal portion 82T is protected with the corresponding rectangular portion 80B.

The front end of each terminal portion 82T is in contact with and is electrically connected to a terminal (not shown) in the corresponding field coil 36. The field coils 36 each include terminals held by a terminal plate (not shown).

The stationary housing 80 and the contact rails 82 are placed close to the terminal plate, and are attached in the frontward direction to the terminal plate. The rectangular portions 80B first come in contact with the terminal plate and are guided on the terminal plate. The front ends of the terminal portions 82T then come in contact with the corresponding terminals on the terminal plate. Thus, the terminal portions 82T are reliably in contact with the terminals in the field coils 36.

The movable housing 84 includes a movable housing body 84M, multiple (two) brush holder receivers 84H, multiple (two) terminal holes 84P, multiple (two) slits 84S, a lever 84V a rib 84B, a projection 84J, and a groove 84R.

The movable housing body 84M is annular or cylindrical,

The brush holder receivers 84H are recessed frontward from the rear end face of the movable housing body 84M.

The movable housing body 84M has two arc-shaped rear end faces separated by the brush holder receivers 84H. The rear end faces of the movable housing body 84M and the radially inward surface of the movable housing body 84M are connected with rear surfaces, or slopes 84C. The slopes 84C are flat or continuously curved surfaces. The slopes 84C are increasingly closer to each other toward the front. In other words, the slopes 84C are tapered with a space between them being smaller toward the front (tapered frontward). The slopes 84C define a bowl shape.

The terminal holes 84P are in the corresponding slopes 84C. The terminal holes 84P are adjacent to the corresponding brush holder receivers 84H.

The slits 84S are arc-shaped. The slits 84S are open in the corresponding slopes 84C.

The lever 84V protrudes radially outward from an upper portion of the circumferential surface of the movable housing body 84M.

The rib 84B protrudes radially outward from the lower rear end face of the movable housing body 84M. The rib 84B extends circumferentially. The rib 84B is adjacent to the right brush holder receiver 84H. The rib 84B in the present embodiment is adjacent to the right end of the outer rib 24B. The rib 84B in the present embodiment is located behind the right of the outer rib 24B.

The projection 84J protrudes downward from the lower circumferential surface of the movable housing body 84M. The projection 84H is located opposite to the lever 84V across the central axis of the movable housing body 84M as viewed from the rear. The projection 84J is adjacent to the rib 84B. The projection 84J is located frontward from the left of the rib 84B.

The groove 84R is recessed annularly at the front of the movable housing body 84M.

The movable housing 84 is connected to the stationary housing 80 in a rotatable manner.

The groove 84R receives the rail retainer 80R and the rail portions 82R.

The slits 84S receive the corresponding protrusions 80C.

The lever 84V includes an upper portion protruding from the upper surface of the outer housing 24. The lever 84V is received in the slot 24S in the outer housing 24.

The user laterally operates the upper portion of the lever 84V to rotate the movable housing 84 relative to the stationary housing 80. The movable housing 84 is rotatable from a first position (the position shown in the figures) at which the lever 84V is at the right end of the slot 24S to a second position at which the lever 84V is at the left end of the slot 24S.

The movable housing 84 may move relative to the stationary housing 80 in a manner other than rotation. For example, the movable housing 84 may move reciprocally by sliding linearly relative to the stationary housing 80.

The leaf springs 85 are formed from metal (stainless steel). The leaf springs 85 are plates. The leaf springs 85 extend in the front-rear direction.

The leaf springs 85 are engageable with multiple receiving portions (not shown) arranged in an arc in the movable housing 84. The leaf springs 85 sequentially engage with the corresponding receiving portions, thus allowing the movable housing 84 rotating relative to the stationary housing 80 to click.

Figure 10:
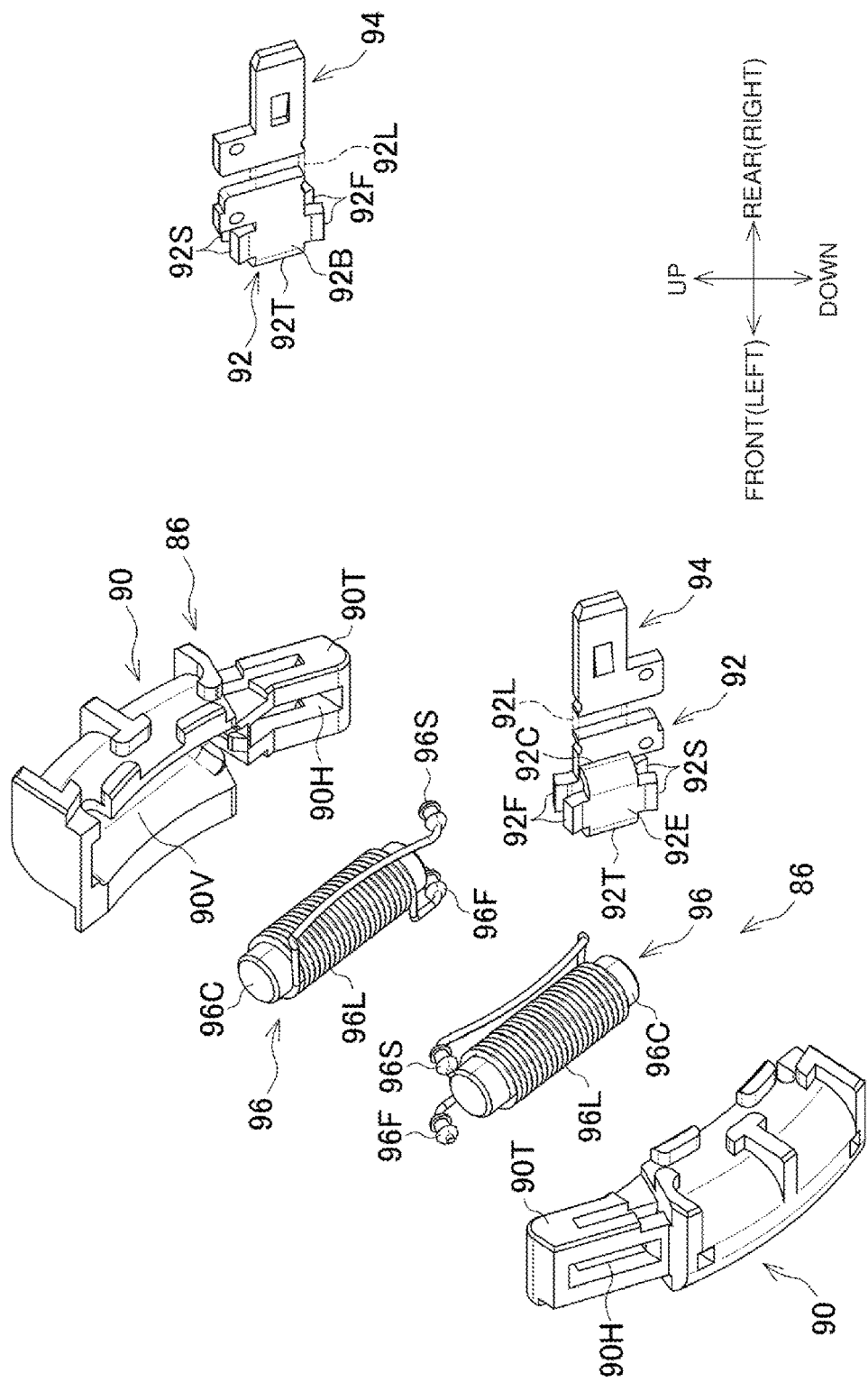
FIG. 10 is an exploded perspective view of brush connection terminal units in the BHU in FIG. 7.
Figure 11:
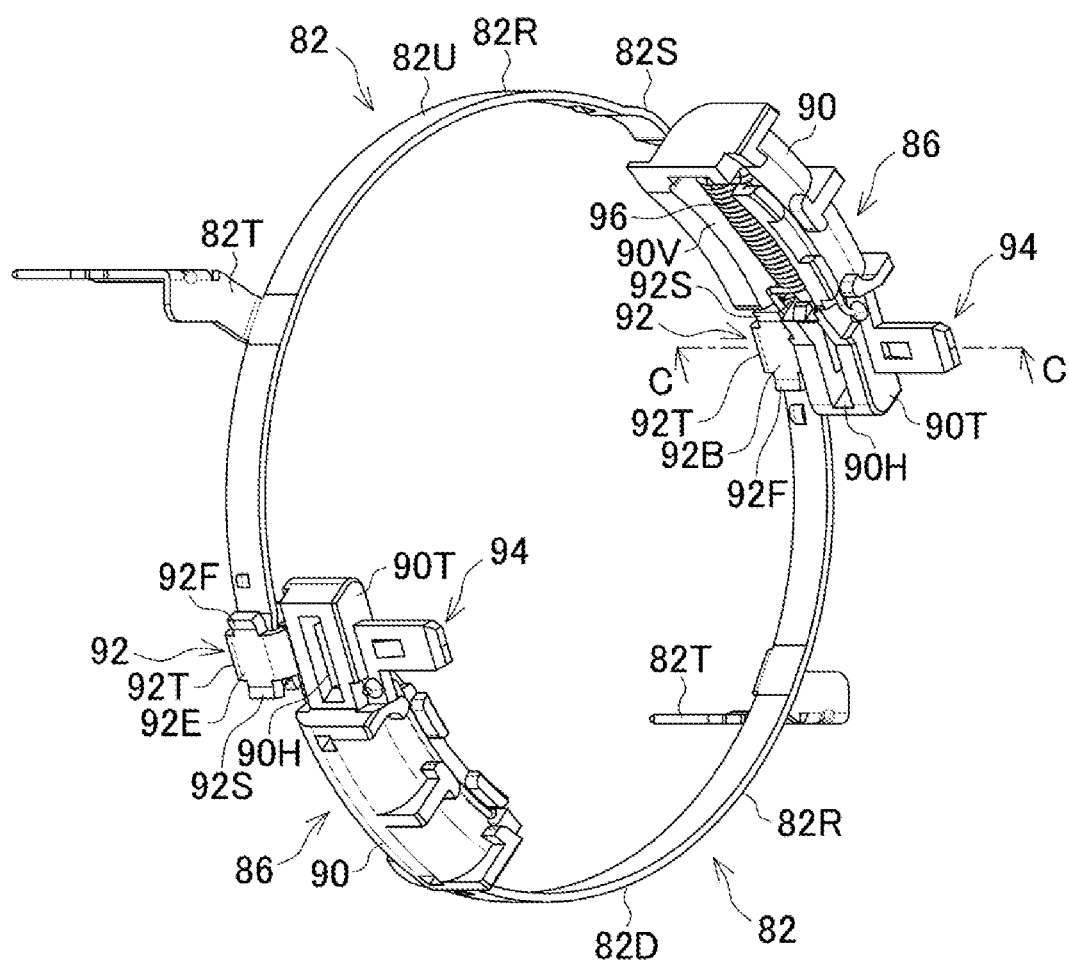
FIG. 11 is a perspective view of the brush connection terminal units and the contact rails in the BHU in FIG. 7.
Figure 12:
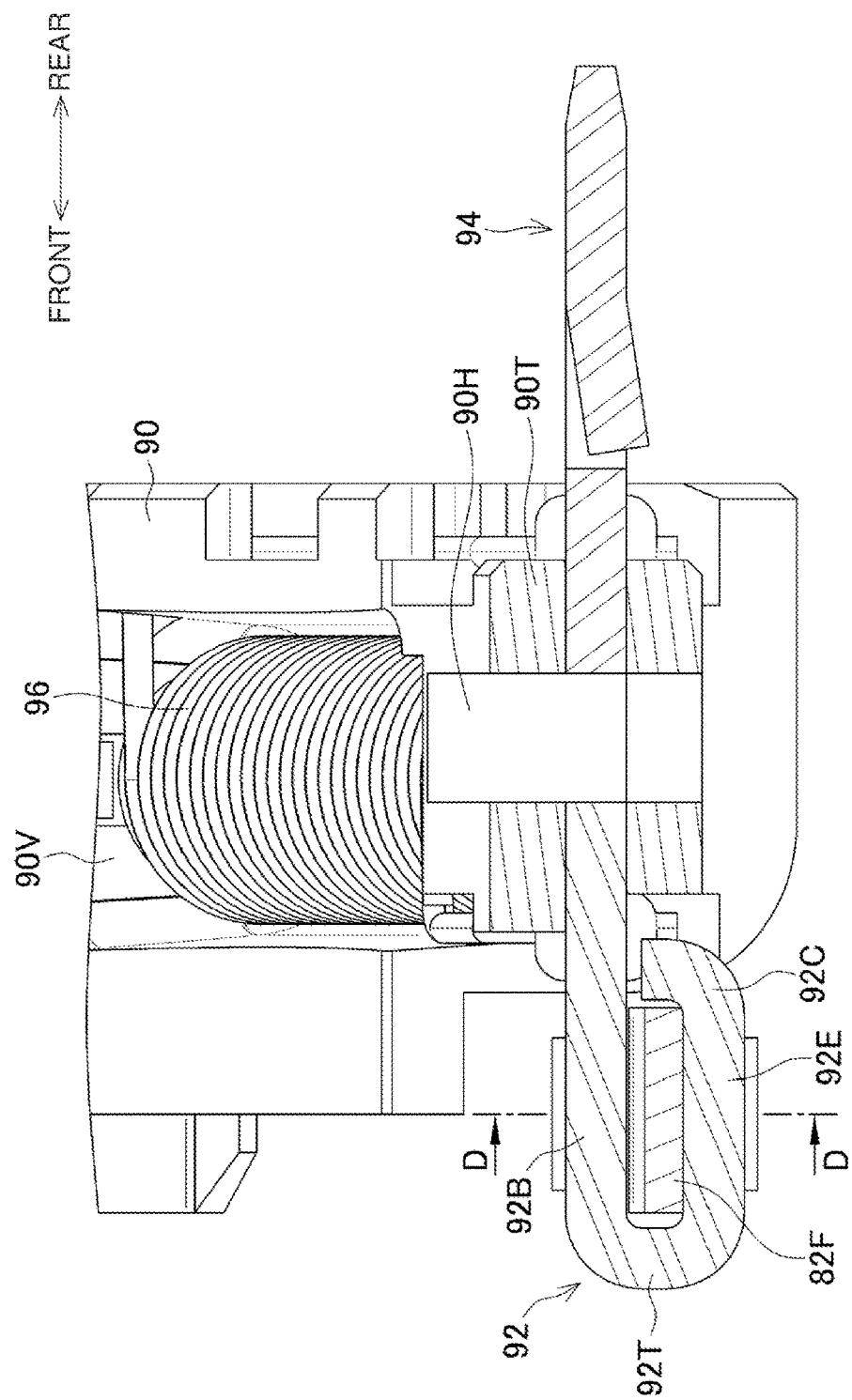
FIG. 12 is a cross-sectional view taken along line C-C in FIG. 11.
Figure 13:
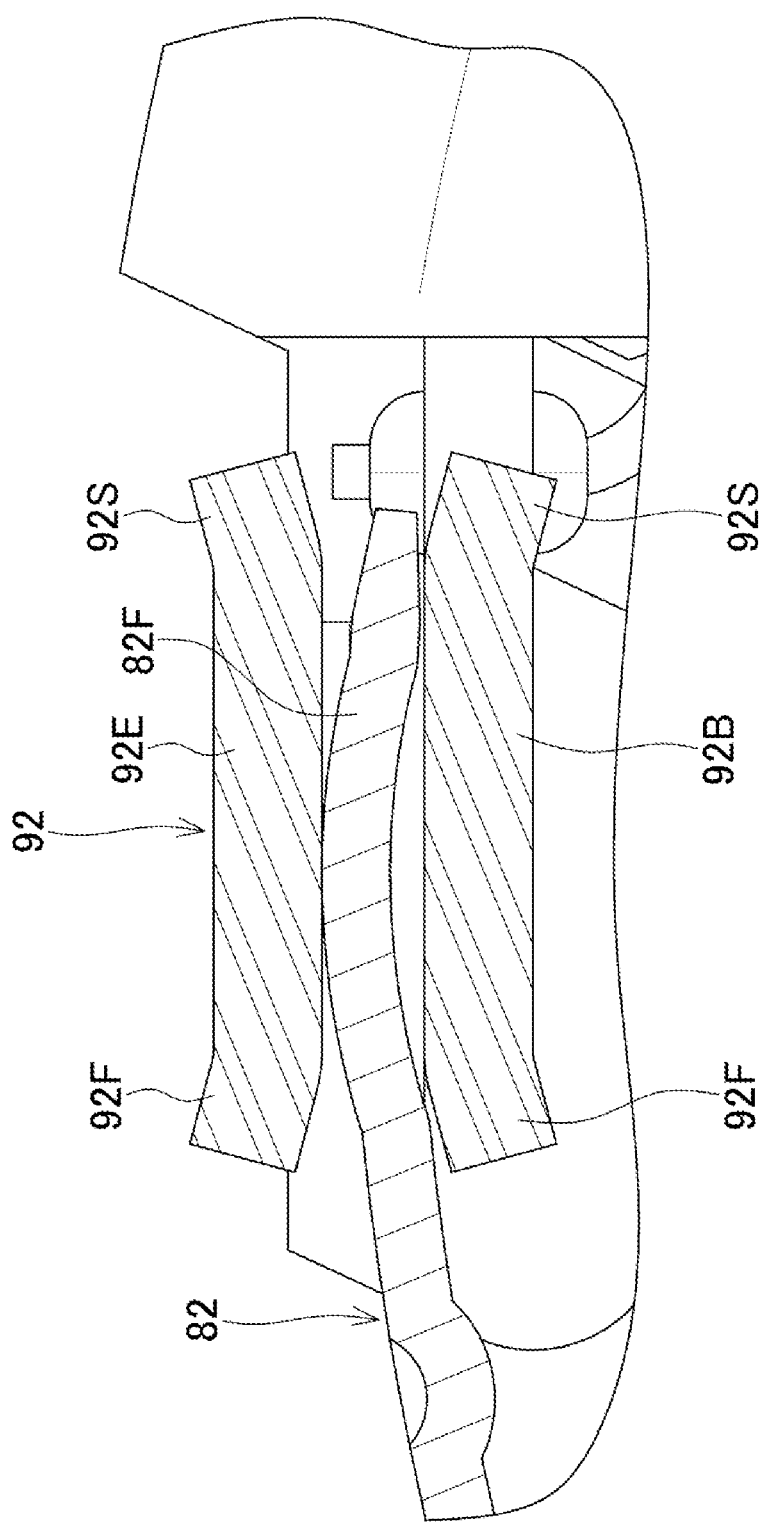
FIG. 13 is a cross-sectional view taken along line D-D in FIG. 12.

FIG. 10 is an exploded perspective view of the brush connection terminal units 86. FIG. 11 is a perspective view of the brush connection terminal units 86 and the contact rails 82. FIG. 12 is a cross-sectional view taken alone line C-C in FIG. 11. FIG. 13 is a cross-sectional view taken along line D-D in FIG. 12.

Each brush connection terminal unit 86 includes a case 90 as a terminal holder, a first terminal 92, a second terminal 94, and a choke coil 96.

The cases 90 are each formed from a synthetic resin. Each case 90 is a curved plate extending in the circumferential and front-rear directions. The case 90 includes a terminal retainer 90T and a recess 90V.

The terminal retainer 90T has a hole 90H in the radial direction.

The recess 90V is located on a curved inner surface and is adjacent to the terminal retainer 90T. The recess 90V is recessed radially outward from other portion of the inner curved surface.

The first terminal 92 is held in a portion in front of the hole 90H in the terminal retainer 90T. The first terminal 92 is formed from metal. The first terminal 92 protrudes frontward from the terminal retainer 90T.

The first terminal 92 has a front portion exposed from the case 90. The front portion of the first terminal 92 includes a base 92B, a turned portion 92T, a distal end 92E, a curved portion 92C, multiple (two) first guides 92F, and multiple (two) second guides 92S.

The base 92B extends in the front-rear direction. The base 92B has its front end connected to the turned portion 92T.

The turned portion 92T is U-shaped as viewed from the above.

The distal end 92E extends in the front-rear direction. The distal end 92E has its front end connected to the turned portion 92T. The distal end 92E and the base 92B extend vertically and are parallel to each other. The distance between the distal end 92E and the base 92B is about the same as the distance by which the first arch 82F and the second arch 82S of the rail portions 82R extend more outward.

The curved portion 92C is connected to the rear end of the distal end 92E. The curved portion 92C bends toward the rear end of the base 92B. The curved portion 92C may be eliminated.

Each brush connection terminal unit 86 includes two first guides 92F. One first guide 92F is located at the base 92B and is closer to a circumferentially middle portion of the brush connection terminal unit 86. The other first guide 92F is located at the distal end 92E and is closer to the circumferentially middle portion of the brush connection terminal unit 86. The first guides 92F each protrude circumferentially from the base 92B or the distal end 92E. The first guides 92F are increasingly spaced apart from each other as they are more away from the base 92B and the distal end 92E. The first guides 92F extend outward.

Each brush connection terminal unit 86 includes two second guides 92S. One second guide 92S is located at the base 92B and is closer to a circumferentially end portion of the brush connection terminal unit 86. The other second guide 92S is located at the distal end 92E and is closer to the circumferentially end portion of the brush connection terminal unit 86. The second guides 92S each protrude circuinferentially from the base 92B or the distal end 92E. The second guides 92S are increasingly spaced apart from each other as they are more away from the base 92B and the distal end 92E. The second guides 92S extend outward. This structure allows the first terminals 92 to receive the corresponding contact rails 82 more smoothly.

The second terminal 94 is held in a front portion of the hole 90U in the terminal retainer 90T. The second terminal 94 is formed from metal. The second terminal 94 protrudes rearward from the terminal retainer 90T.

The second terminal 94 includes a rear portion exposed from the case 90.

Each choke coil 96 includes a core 96C and a wire 96L.

The core 96C is formed from ferrite (a ceramic material including iron oxide). The core 96C extends circumferentially.

The wire 96L is wound around the core 96C.

Each choke coil 96 includes a first coil terminal 96F and a second coil terminal 96S. The first coil terminal 96F is electrically connected to the first terminal 92 by soldering or another method. The second coil terminal 96S is electrically connected to the second terminal 94 by soldering or another method.

The choke coils 96 are received in the corresponding recesses 90V. The cases 90 thus serve as containers for the corresponding choke coils 96 and are each installed in a smaller space.

The choke coil 96 may be connected to a single pair of the first terminal 92 and the second terminal 94. The choke coils 96 may be located in other portions between the field coils 36 and the brushes 30. The choke coils 96 may be, for example, located on contact rails 82.

The first terminal 92 and the second terminal 94 are basically an integral terminal as in FIG. 10 with a connection portion 92L indicated by the dotted line. The first terminal 92, the second terminal 94, and the case 90 are integral with one another. The connection portion 92L is received in the hole 90H and is exposed from the case 90.

When no choke coil 96 is to be used, a brush connection terminal unit 86 including the integral terminal is used.

When a choke coil 96 is to be used, the connection portion 92L is partially or entirely removed by, for example, cutting to separate the first terminal 92 and the second terminal 94. The first coil terminal 96F in the choke coil 96 is then electrically connected to the first terminal 92, and the second coil terminal 96S is electrically connected to the second terminal 94.

The integral terminal or the first terminal 92 and the second terminal 94 are integral with and firmly attached to the case 90. The choke coil 96 may be used more easily by simply selecting either cutting or not cutting the connection portion 92L. The first terminal 92 and the second terminal 94 integral with each other are thus easier to handle with. The first terminal 92 and the second terminal 94 connected together can be cut apart through the hole 90U, thus simplifying the separation of the first terminal 92 and the second terminal 94.

The first terminal 92 and the second terminal 94 may be basically separate from each other. The first terminal 92, the second terminal 94, and the case 90 may be formed in a manner other than being integral with one another.

The brush connection terminal units 86 are fixed in the groove 84R on the movable housing 84.

The brush connection terminal units 86 are located at positions corresponding to the spaces circumferentially between the rail portions 82R of the contact rails 82.

The second terminals 94 in the brush connection terminal units 86 are placed in the corresponding terminal holes 84P in the movable housing 84.

The brush holders 88 hold the corresponding brushes 30.

Each brush holder 88 includes a brush case 100, a spiral spring 102 being an elastic member, and a brush terminal 104.

The brush cases 100 hold the corresponding brushes 30. The brush cases 100 are held in the corresponding brush holder receivers 84H.

The spiral springs 102 are held in the corresponding brush cases 100. The spiral springs 102 push the corresponding brushes 30 radially inward. The brushes 30 come in contact with the commutator 45 on their radially inward surfaces. Each brush 30 extends through the left opening 22L or the right opening 22R.

The brush terminals 104 are electrically connected to the corresponding brushes 30. Each brush terminal 104 is electrically connected to the corresponding second terminal 94.

Each lead wire 89 includes a lead wire body 89M and a lead wire terminal 89T. The lead wire terminals 89T are formed from metal and are folded plates. Each lead wire terminal 89T is electrically connected to a conductive wire under a covering of the corresponding lead wire body 89M.

As shown in FIG. 9, each lead wire terminal 89T is placed in the hole 80H in the corresponding terminal retainer 80T and is held by the stationary housing 80. The lead wire terminal 89T has its front end reaching the corresponding rectangular portion 80B. The front edge of the lead wire terminal 89T is located rearward from the front edge of the rectangular portion 80B. In other words, the front end of each lead wire terminal 89T does not protrude from the corresponding rectangular portion 80B, and is located rearward relative to the front edge of the corresponding rectangular portion 80B.

The front end of each lead wire terminal 89T is protected with the corresponding rectangular portion 80B.

The front end of each lead wire terminal 89T is in contact with and is electrically connected to a terminal in the corresponding field coil 36.

When the stationary housing 80 and the contact rails 82 are attached to the terminal plate, the rectangular portions 80B first come in contact with the terminal plate and are guided on the terminal plate. The front ends of the lead wire terminals 89T then come in contact with the corresponding terminals on the terminal plate. The front ends of the lead wire terminals 89T are thus reliably in contact with the terminals in the field coils 36.

The lead wire bodies 89M are electrically connected to the power cable 6 or the trigger switch 50.

Each lead wire 89 may not be a component of the BHU 31.

When the outer housing 24 is in the normal state and the trigger 52 is not operated rearward (no operation on the trigger 52) with the movable housing 84 at the first position (the position shown in the figures), the first terminal 92 in each brush connection terminal unit 86 is in contact with the first arch 82F on the corresponding contact rail 82. Each first arch 82F is surrounded by the corresponding base 92B, turned portion 92T, distal end 92E, and curved portion 82C (the surrounding structure of the first terminal 92).

When the movable housing 84 is rotated to the second position, each first terminal 92 moves away from the corresponding first arch 82F, moving closer to and coming in contact with the adjacent second arch 82S. The second guides 92S in each first terminal 92 receive the corresponding second arch 82S in a wider space between them, and guide the second arch 82S to between the base 92B and the distal end 92E.

When the movable housing 84 is at the second position, each first terminal 92 is in contact with the corresponding second arch 82S. Each second arch 82S is surrounded by the corresponding base 92B, turned portion 92T, distal end 92E, and curved portion 82C (the surrounding structure of the first terminal 92).

At least one of the surrounding structure of the first terminal 92, the guidance with the second guides 92S, or the formation of the second arches 82S allows the first terminals 92 to be more reliably in contact with the corresponding contact rails 82. This structure reduces chattering when the first terminals 92 receive the corresponding second arches 82S.

When the outer housing 24 is in the normal state and the movable housing 84 is rotated from the second position to the first position, each first terminal 92 moves away from the corresponding second arch 82S, moving closer to and coming in contact with the adjacent first arch 82F. The first guides 92F in each first terminal 92 receive the corresponding first arch 82F in a wider space between them, and guide the first arch 82F to between the base 92B and the distal end 92E.

At least one of the surrounding structure of the first terminal 92, the guidance with the first guides 92F, or the formation of the first arches 82F allows the first terminals 92 to be more reliably in contact with the corresponding contact rails 82. This structure reduces chattering when the first terminals 92 receive the corresponding first arches 82F.

The rail portions 82R of the contact rails 82 define a larger space radially inside when being placed in the circumferential direction and the front-rear direction (direction of the motor shaft 40) than when being placed in the circumferential direction and the vertical direction to have the same dimensions in the radial direction of the rail portions 82R.

The larger space allows the space radially inside the BHU 31 to be larger accordingly. The blow from the fan 32 is then more easily guided into the motor 29, allowing the motor 29 to be cooled more efficiently.

The larger space can also accommodate another structure.

For example, the annular or cylindrical BHU 31 with a larger space radially inside allows the rear motor housing 22B to have a larger internal space accordingly. The internal space may accommodate a stronger holding structure for the rear bearing 46. More specifically, another rib to hold the rear bearing 46 or more ribs may be included, or at least one of the ribs or the rear motor housing 22B may be thicker.

In some embodiments, the rail portions 82R are radially smaller to define a space radially inside that is as large as a space defined by rail portions 82R extending in the circumferential and vertical directions. The structure may thus be smaller.

When the outer housing 24 is in the normal state and the movable housing 84 is being rotated to a position between the first position and the second position (a transitional position), the projection 84J on the movable housing 84 is located behind the upper-trigger projection 52P. This structure prevents the user from operating the trigger 52 rearward with the upper-tugger projection 52P coming in contact with the projection 84J.

When the outer housing 24 is in the normal state and the movable housing 84 is at the transitional position, the projection 84J on the movable housing 84 is located in front of the center rib 24J on the outer housing 24. This structure prevents the outer housing 24 from moving forward with the center rib 24J coming in contact with the projection 84J. When the movable housing 84 is not at the transitional position, the projection 84J is located above the center rib 24J. This structure no longer prevents the outer housing 24 from moving forward and allows the outer housing 24 to move forward.

When the outer housing 24 is in the normal state or in the forward state and the movable housing 84 is at the first position with the trigger 52 operated rearward by the user, the projection 84J is located on the left of the upper-trigger projection 52P. This structure prevents the user from moving the movable housing 84 to the second position with the projection 84J coming in contact with a left portion of the upper-trigger projection 52P.

When the outer housing 24 is in the normal state or in the forward state and the movable housing 84 is at the second position with the trigger 52 operated rearward by the user, the projection 84J is located on the right of the upper-trigger projection 52P. This structure prevents the user from moving the movable housing 84 to the first position with the projection 84J coining in contact with a right portion of the upper-trigger projection 52P.

When the outer housing 24 moves from the normal state to the forward state with the movable housing 84 at the first position, the outer rib 24B moves closer to the rib 84B and is located on the right of the rib 84B. This structure prevents a leftward operation on the lever 84V and an operation to move the movable housing 84 to the second position, with the rib 84B coming in contact with the outer rib 24B.

When the outer housing 24 is in the normal state and the movable housing 84 is at the second position, the left end of the rib 84B is located in an upper right position behind the outer rib 24B. When the outer housing 24 further moves from the normal state to the forward state, the outer rib 24B moves closer to the rib 84B and is located at the lower left of the rib 84B. This structure prevents a rightward operation on the lever 84V and an operation to move the movable housing 84 to the first position, with the rib 84B coming in contact with the outer rib 24B.

The MU 31 includes the brushes 30 and the brush holders 88 arranged laterally.

The BHU 31 is vertically smaller than a BHU 31 with the brushes 30 and the brush holders 88 arranged vertically.

The BHU 31 protrudes less in the downward direction. The trigger unit 5 can thus be located closer to the central axis (operational axis) of the output unit 8, improving workability.

The BHU 31 protrudes less in the upward and downward directions. In this structure, the outer housing 24 and the BHU 31 held by the outer housing 24 can move by a larger distance in the front-rear direction than in a structure with vertically arranged brushes 30 and brush holders 88.

An example operation of the hammer drill 1 according to the present embodiment will now be described.

When the user operates the trigger 52 rearward with the movable housing 84 at the first position, the trigger switch 50 is turned on. Power from the power cable 6 is supplied to the field coils 36 through the pair of lead wires 89, the brushes 30, the brush connection terminal units 86, and the contact rails 82. The field coils 36 are electrically connected to the corresponding brushes 30 through the brush connection terminal units 86 and the contact rails 82. The armature 34 thus rotates in a first direction (forward rotation). The amount by which the armature 34 rotates corresponds to the amount of a rearward operation on the trigger 52. The choke coils 96 in the brush connection terminal units 86 block higher-frequency components of power, reducing electromagnetic interference (EMI) generation. This reduces noise from the higher-frequency components. A rearward operation on the trigger 52 prevents the user from moving the movable housing 84 to the second position with the projection 84J coming in contact with the left portion of the upper-trigger projection 52P.

A leftward operation on the lever 84V without a rearward operation on the trigger 52 allows the user to switch the movable housing 84 from the first position to the second position. During the switching, a rearward operation on the trigger 52 is prevented by the upper-trigger projection 52P coming in contact with the projection 84J. During the switching, the outer housing 24 is less likely to move forward with the center rib 24J coming in contact with the projection 84J.

When the user operates the trigger 52 rearward with the movable housing 84 at the second position, the trigger switch 50 is turned on. The brush connection terminal units 86 are in contact with the contact rails 82 at different positions, and the brushes 30 come in contact with the commutator 45 in a relationship opposite to the relationship at the first position. Thus, power from the power cable 6 is supplied reversely to the field coils 36. The field coils 36 are electrically connected to the corresponding brushes 30 through the brush connection terminal units 86 and the contact rails 82. The armature 34 thus rotates in a second direction (reverse rotation). The amount by which the armature 34 rotates corresponds to the amount of a rearward operation on the trigger 52. The choke coils 96 in the brush connection terminal units 86 block higher-frequency components of power, reducing EMI generation. This reduces noise from the higher-frequency components. The trigger 52 operated rearward prevents the user from moving the movable housing 84 to the first position, with the projection 84J coming in contact with the right portion of the upper-trigger projection 52P.

The armature 34 rotates to rotate the motor shaft 40. The rotation of the motor shaft 40 is reduced and transferred through the power transmission 60 to the output unit 8 with a tip tool. The rotation of the motor shaft 40 is, through the striking assembly 62, converted to a striking force to strike the tip tool as appropriate.

The output unit 8 rotates and also strikes as appropriate to process a workpiece (operation).

At least one of vibration or impact generated during processing is less with the outer housing 24 movable in the front-rear direction and the flexible member 28 located between the motor housing 22 and the outer housing 24.

When the outer housing 24 is moved forward, an operation to rotate and move the movable housing 84 is prevented by the rib 84B coming in contact with the outer rib 24B.

When the motor shaft 40 rotates, the fan 32 rotates to draw air in through the inlets 24A. The air is drawn to pass through the hammer drill 1, or specifically through the inside and the outside of the motor 29 before flowing out through the outlets 20V. Such flow of air (blow) cools the internal components of the hammer drill 1 including the motor 29.

More specifically, the blow can be smoothly guided into the inside of the motor 29 with the slopes 84C of the movable housing 84 that are flat or continuously curved and are tapered forward.

Air through the inlets 24A partially flows through the left opening 22L and the right opening 22R into the motor housing 22.

The present disclosure is not limited to the above embodiments and the modifications and may further include, for example, modifications described below as appropriate.

The structure of the housing may be modified variously. For example, the motor housing and the gear housing may be integral with each other, or at least either one of the housings may be further divided.

The power tool may include a battery mount and a battery mounted on the battery mount instead of the power cable 6 and may be powered by the battery. The striking assembly 62 may be eliminated. The numbers of at least coils or lead wires used herein may be increased or decreased. The numbers of screws and threaded holes may be increased or decreased. The protrusions and recesses may be located at different positions. The contact rails 82 may be formed from a material other than brass. At least any of the engaging portions, the connectors, the screwed portions, the retainers, and the attachment portions may be modified to a different structure or to a different type or to both a different structure and a different type. The number, arrangement, material, structure, or type of at least one of any components or portions may be modified as appropriate, and at least one of any components or portions may be eliminated as appropriate.

The present disclosure may be applicable to different types of hammer drills or other power tools, gardening tools, or electric work machines.

REFERENCE SIGNS LIST 1 hammer drill (power tool)
2 housing
22 motor housing
24 outer housing
28 flexible member
29 motor
30 brush
31 brush holder unit (BHU)
33 field
34 armature
36 field coil
45 commutator
80 stationary housing
80B rectangular portion
82 contact rail
82R rail portion
82T terminal portion
84 movable housing
84C slope (flat surface, continuously curved surface)
90 case (terminal holder)
90V recess
92 first terminal
92F first guide (guide)
92S second guide (guide)
94 second terminal
96 choke coil

What is claimed is:
1. A power tool, comprising:
a housing;
a stator fixed to the housing, the stator including a field coil;
an armature rotatable relative to the stator, the armature including a commutator;
two brushes configured to come in contact with the commutator; and
a brush holder unit holding the two brushes, the brush holder unit including
a stationary housing,
two contact rails held by the stationary housing and electrically connectable to the field coil, each of the contact rails including
a rail portion being arc-shaped, and
a terminal portion intersecting with the rail portion,
a movable housing holding the two brushes and movable relative to the stationary housing,
two first terminals held by the movable housing, each of the two first terminals being configured to come in contact with either of the two contact rails in response to movement of the movable housing,
two second terminals held by the movable housing, each of the two second terminals being electrically connectable to a corresponding brush of the two brushes, and
a choke coil located between at least one of the two first terminals and at least one of the two second terminals,
wherein
each of the two contact rails includes an arch to come in contact with the either of the two first terminals,
the stationary housing includes a rectangular portion, and
the terminal portion includes a distal end received in the rectangular portion.

2. The power tool according to claim 1, wherein
the brush holder unit includes a terminal holder holding one of the two first terminals and one of the two second terminals, and
the one of the two first terminals and the one of the two second terminals are held by the movable housing with the terminal holder in between.

3. The power tool according to claim 2, wherein
the one of the two first terminals, the one of the two second terminals, and the terminal holder are integral with one another.

4. The power tool according to claim 3, wherein
the terminal holder has a recess accommodating the choke coil.

5. The power tool according to claim 2, wherein
the terminal holder has a recess accommodating the choke coil.

6. The power tool according to claim 2, wherein
the terminal holder has a hole in a portion between the one of the two first terminals and the one of the two second terminals.

7. The power tool according to claim 1, wherein
each of the two first terminals surrounds the either of the two contact rails.

8. The power tool according to claim 1, wherein
each of the two contact rails includes an arch to come in contact with the either of the two first terminals.

9. The power tool according to claim 1, wherein
each of the two first terminals includes a guide extending outward.

10. The power tool according to claim 1, wherein
the two contact rails extend in a direction of a rotation axis of the armature.

11. The power tool according to claim 1, wherein
the two contact rails comprise brass.

12. The power tool according to claim 1, wherein
the terminal portion is electrically connectable to the field coil.

13. The power tool according to claim 1, wherein
the terminal portion has the distal end not protruding from a distal end of the rectangular portion.

14. The power tool according to claim 1, wherein
the movable housing has a flat or continuously curved surface, and the flat or continuously curved surface is located opposite to the stationary housing.

15. The power tool according to claim 1, wherein
the stationary housing is attached to the housing.

16. The power tool according to claim 1, wherein the housing includes
a motor housing holding the stator, and
an outer housing movable relative to the motor housing.

17. The power tool according to claim 16, further comprising:
a flexible member located between the motor housing and the outer housing.

* * * * *